United States Patent [19]

Taylor

[11] Patent Number: 5,297,575
[45] Date of Patent: Mar. 29, 1994

[54] IN-LINE HIGH PRESSURE FLUID RELEASE VALVE

[76] Inventor: Julian S. Taylor, 8300 SW. 8th, Oklahoma City, Okla. 73128

[21] Appl. No.: 99,380

[22] Filed: Jul. 30, 1993

[51] Int. Cl.⁵ .............................................. F16K 17/14
[52] U.S. Cl. ...................................... 137/70; 137/467
[58] Field of Search .................... 137/67, 68.1, 70, 71, 137/461, 467; 251/282

[56] References Cited

U.S. PATENT DOCUMENTS

| | | | |
|---|---|---|---|
| 2,912,992 | 11/1959 | Gasche et al. | 137/70 |
| 3,323,531 | 6/1967 | Spellman | 137/68.1 |
| 3,476,133 | 11/1969 | Stedfeld | 137/467 X |
| 4,587,987 | 5/1986 | West | 137/71 X |
| 4,724,857 | 2/1988 | Taylor | 137/67 |
| 5,012,834 | 5/1991 | Taylor | 137/70 |
| 5,067,511 | 11/1991 | Taylor | 137/67 |

Primary Examiner—Martin P. Schwadron
Assistant Examiner—Kevin L. Lee
Attorney, Agent, or Firm—Robert K. Rhea

[57] ABSTRACT

An in-line high pressure fluid release valve is formed by a valve body having a cylinder and having a transverse opening forming a fluid passageway interposed in a fluid conductor. A piston normally closing the fluid passageway and having a fluid passageway size transverse opening is guided to prevent angular rotation during longitudinal sliding movement in the cylinder by a piston rod and a cylinder wall supported guide rod projecting into a piston wall slot for mating and mismating the piston opening with the flow passageway. A pin cage connected with the piston rod end of the cylinder axially supports a collapsible pin normally biasing the piston to a fluid passageway closed position until upstream fluid pressure of a predetermined value channeled through a cylinder wall fluid bypass at the piston end opposite the piston rod to bias the piston toward a passageway open position for releasing fluid pressure downstream. A fluid bypass check valve holds fluid under pressure in the piston cavity and against the piston end opposite its rod to insure full travel of the piston for axially aligning its opening with the fluid passageway.

10 Claims, 2 Drawing Sheets

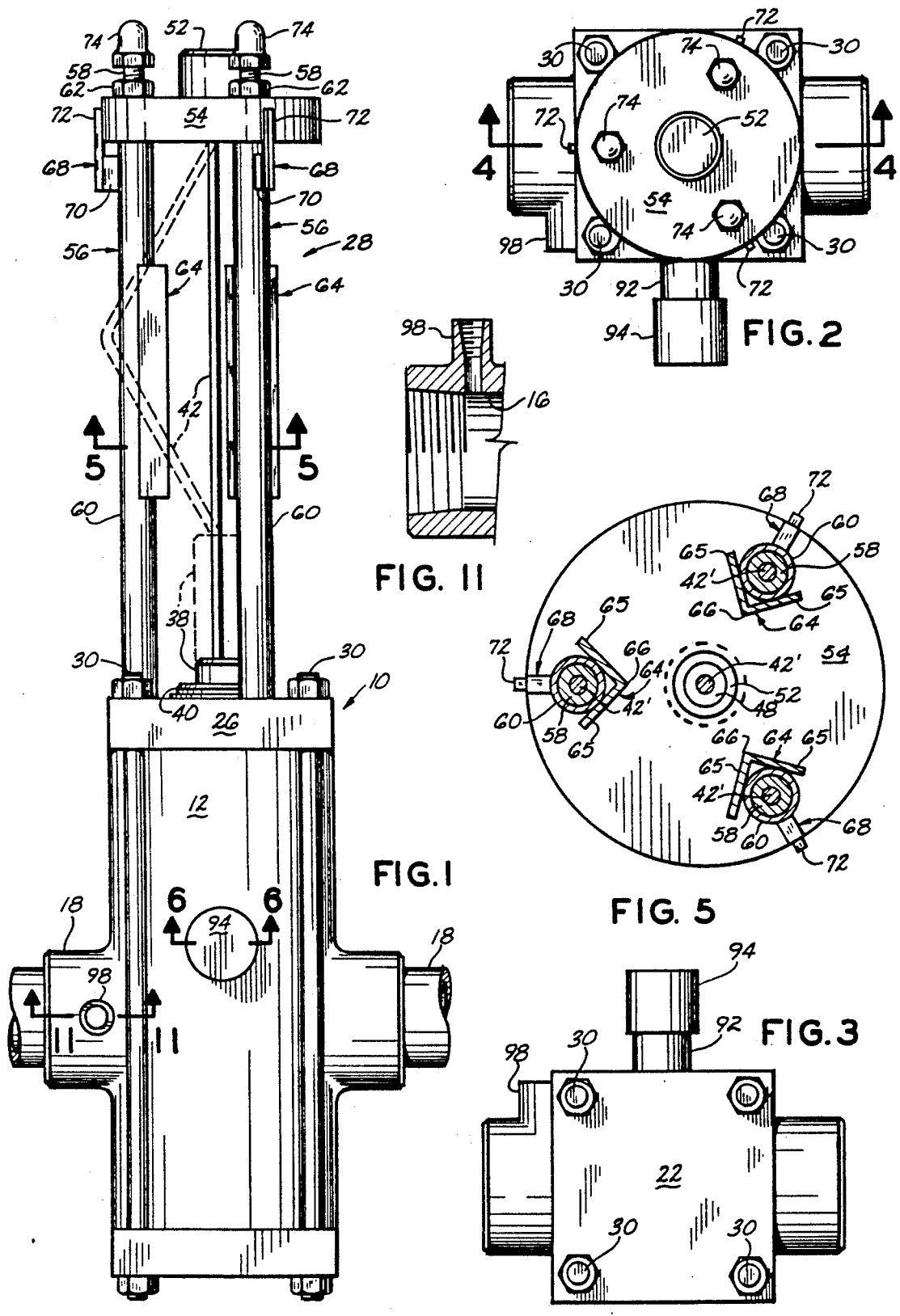

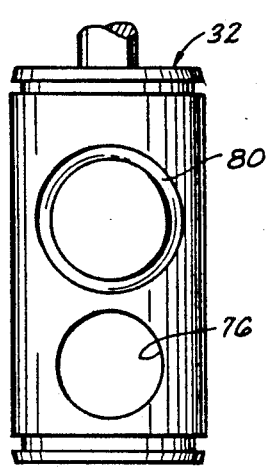
FIG. 7
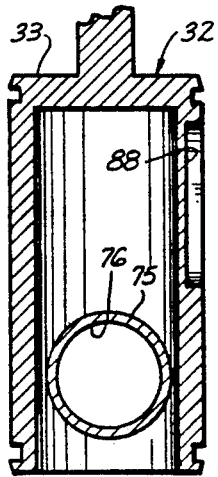
FIG. 9
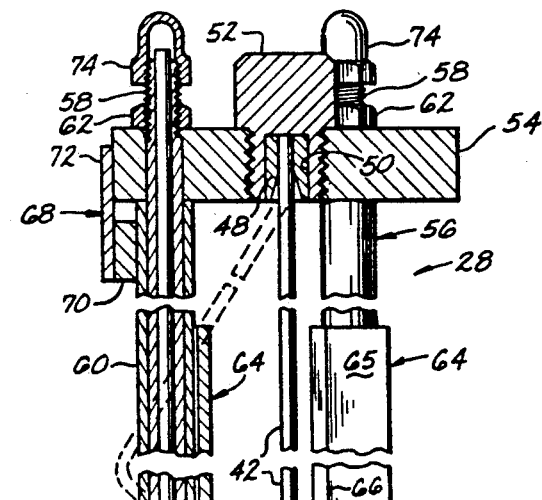
FIG. 4
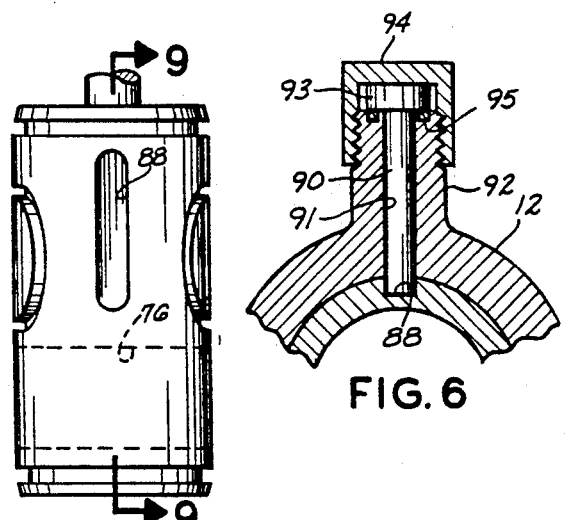
FIG. 6
FIG. 8
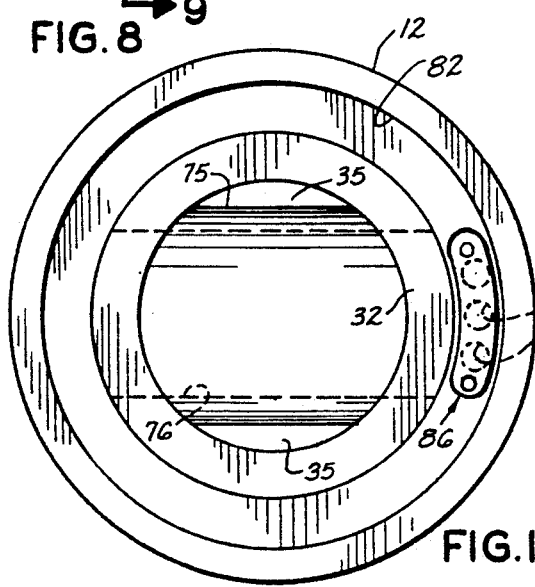
FIG. 10

IN-LINE HIGH PRESSURE FLUID RELEASE VALVE

BACKGROUND OF THE INVENTION

The present invention relates to high pressure fluid conductors and more particularly to a valve interposed in such high pressure fluid conductors to release high pressure fluid above a predetermined value.

1. Field of the invention

In high pressure fluid systems, it is desirable to monitor the fluid pressure and release it downstream when it reaches a predetermined value.

This invention provides a high pressure fluid release valve which is interposed in a high fluid pressure conductor upstream with respect to a safety relief valve and features a fluid pressure biased piston normally transversely intersecting the flow passageway of a high pressure fluid conductor in fluid tight sealing relation.

2. Description of the prior art

The ASME pressure vessel code permits the installation of rupture disk pressure relief devices upstream and downstream from the inlet and outlet ports of a safety relief valve. The added rupture disc relief device results in several system advantages, namely, zero fluid leakage to the atmosphere; extending periods between overhauls; valves may be tested in place; and, safety relief valve life is extended by isolating corrosive fluids from internal valve parts.

My U.S. Pat. Nos. 4,724,857, issued Feb. 16, 1988 for PRESSURE RELIEF VALVE; U.S. Pat. No. 5,012,834, issued May 7, 1991 for FLUID PRESSURE FLARE RELIEF VALVE; and U.S. Pat. No. 5,067,511, issued Nov. 26, 1991 for HIGH PRESSURE FLUID EMERGENCY SHUTOFF VALVE are believed representative of the state-of-the-art and all disclose a valve body containing a piston in which unbalanced fluid pressure axially acting on the piston unseats the piston to open a fluid passageway through the valve body when the fluid pressure reaches a predetermined limit.

The present invention is distinctive over the above named patents by providing a valve interposed in a high pressure fluid line in which the valve body slidably supports a transversely apertured piston normally intersecting and closing a fluid passageway through the valve fluid tight.

The wall of the valve body contains a fluid bypass admitting fluid pressure from the inlet port to one end of the piston for moving the piston in a flow passageway opening direction by collapsing a pressure responsive pin to release the fluid pressure downstream.

SUMMARY OF THE INVENTION

A valve body having axially aligned inlet and outlet ports forming a flow passageway therethrough is axially interposed in a fluid conductor. The valve body is provided with a cylindrical wall extending transversely of the flow passageway for forming a cylinder having one closed end and an apertured end wall at its opposite end supporting a pin cage means.

The cylinder slidably contains a piston having a piston rod projecting through the apertured end wall and normally abutting the end of a collapsible pin supported at its other end portion by the pin cage means. Angular rotation of the piston is precluded by a valve body guide rod sliding in a piston wall slot.

Seals normally seal the piston wall with the inlet and outlet port and close the fluid passageway. The end portion of the piston opposite the piston rod is provided with a transverse opening for mating and mismating with the fluid passageway.

The cylinder wall adjacent the inlet port contains a fluid bypass communicating with the piston end opposite the piston rod. Upstream fluid pressure above a predetermined value in the inlet port acts on a seal on the end of the piston opposite its rod and moves the piston toward the pin cage means, collapsing the axial force responsive pin and opening the fluid passageway to release fluid pressure.

The principal object of this invention is to provide a fluid pressure relief valve in which a fluid pressure responsive piston extending transversely of a fluid passageway opens the fluid passageway to release fluid pressure downstream in response to fluid pressure on the piston area creating an axial force above a predetermined value by collapsing an axial force responsive pin.

BRIEF DESCRIPTION OF THE DRAWINGS

FIG. 1 is a side elevational view of the valve in operative position and illustrating by broken lines the collapsed position of a collapsible pin;

FIG. 2 is a top view;

FIG. 3 is a bottom view;

FIG. 4 is a fragmentary vertical cross sectional view, to a larger scale, taken substantially along the line 4—4 of FIG. 2 and illustrating, by solid lines, the piston in fluid passageway closed position and by broken lines, the piston in fluid passageway partially open position;

FIG. 5 is a horizontal cross sectional view, to a similar scale, taken substantially along the line 5—5 of FIG. 1;

FIG. 6 is a horizontal sectional view, to a similar scale, taken substantially along 6—6 of FIG. 1;

FIG. 7 is a fragmentary side elevational view, to a smaller scale, of the piston looking in the direction of the arrows 7—7 of FIG. 4;

FIG. 8 is a fragmentary elevational view of the piston, per se, rotated 90 counterclockwise from the position of FIG. 7;

FIG. 9 is a fragmentary vertical cross sectional view taken substantially along the line 9—9 of FIG. 8;

FIG. 10 is an end elevational view of the cylinder wall and piston looking in the direction of the arrows 10—10 of FIG. 4; and, FIG. 11 is a fragmentary vertical cross sectional view, to a larger scale, taken substantially along the line 11—11 of FIG. 1.

DESCRIPTION OF THE PREFERRED EMBODIMENTS

Like characters of reference designate like parts in those figures of the drawings in which they occur.

In the drawings:

Referring first to FIGS. 1-5, the reference numeral 10 indicates the valve as a whole comprising a cylindrical body 12, having diametrically opposite axially aligned sleeves intermediate its ends forming inlet and outlet ports 14 and 16 adapted to be interposed in a fluid line 18 and forming a fluid passageway 20 transversely of the cylinder 12.

An end plate or wall 22, having a seal 24, closes one end of the cylinder 12 fluid-tight and having its other open end normally disposed adjacent the cylinder end wall 22. Similarly, a centrally bored end plate or wall 26 overlies the other or top end of the cylinder 12 and supports a pin cage means 28 in outstanding relation. The end walls 22 and 26 are secured to the cylinder 12 by a plurality of bolts and nuts 30.

A sleeve piston 32, closed at one end by a piston end wall 33 forming a piston cavity 35, is slidably received by the inner wall surface of the cylinder 12 and normally closes the fluid passageway 20 and defines cylinder chambers 34 and 36, at its respective ends. The cylinder chamber 36 communicates with the piston cavity 35. A tube 75, integrally formed with the piston wall, extends transversely of the depending end portion of the piston for forming a fluid passageway or piston opening 76 preferably diametrically equal in transverse cross sectional area with the inlet and outlet ports 14 and 16, respectively, for the purposes believed presently apparent. A piston rod 38 connected with the piston end wall 33 slidably projects through a sleeve guide 40 secured in the central bore of the cylinder end wall 26. The piston is normally maintained in flow passageway closed position by the piston rod 38 contacting one end of a collapsible pin 42 supported at its other end by the cage means 28 in the manner which will now be described.

The pin cage means 28 comprises the collapsible pin 42 inserted at its depending end portion in a bushing 44 nested by a socket 46 formed in the uppermost end portion of the piston rod 38. The other end portion of the collapsible pin 42 is similarly inserted in a bushing 48 nested by a socket 50 formed in a pin nut 52 threadedly received by a centrally bored and threaded cage end plate 54 maintained in parallel spaced relation with respect to the cylinder end wall 26 by a plurality (3) of post means 56.

The post means 56 are equally spaced radially about the axis of the collapsible pin 42 and in the interest of brevity only one on the post means 56 is described in detail.

The post means 56 comprises a bolt 58 threadedly connected at its depending end with the cylinder end wall 26 and slidably received at its other threaded end portion by a bore in the cage plate 54 with a tubular sleeve or spacer 60 interposed between the end wall 26 and the cage plate 54. A nut 62 connected with the other end of the bolt 58 impinges the spacer 60 between the end wall 26 and cage plate 54.

An elongated V-shaped, in transverse section, pin deflector 64, formed by a pair of plates 65 (FIG. 5) joined together along one edge of each plate in substantial right angle relation, is longitudinally secured in straddling relation to the spacer 60, medially its ends, with the apex 66 of the deflector in radial alignment with the pin 42. The deflector 64 is maintained in this position by an L-shaped guide 68 having its foot portion 70 rigidly secured to the periphery of the spacer 60 adjacent the cage plate 54 and its upstanding foot portion 72 frictionally contacting an intermediate portion of the periphery of the cage plate 54. The purpose of the deflector 64 is to guide the pin 42 laterally of the respective spacer 60 during pin collapsing action as presently explained.

The bolt 58 is longitudinally drilled from its upper end for receiving a spare collapsible pin 42' maintained within the bolt 58 by an acorn nut 74.

Referring also to the remaining Figures, the depending end portion of the piston 32 is provided with a transverse opening 76, preferably diametrically equal with the diameter of the inlet and outlet ports 14 and 16 and axially parallel with the axis of the fluid passageway 20, for the reasons presently explained.

Seals 78, at respective end portions, of the piston seal its periphery with the inner wall surface of the cylinder 12.

Other diametrically opposite endless seals, such as O-ring seals 80, diametrically slightly greater than the diameter of the inlet and outlet ports, seal the piston wall with the cylinder wall at the upstream and downstream side of the piston.

The depending end portion of the cylinder 12 is rabbeted, as at 82, and forms the cylinder chamber 36. On the upstream side of the cylinder wall, this rabbeted surface 82 is provided with a plurality of fluid bypass bores 84 (three in the example shown) which provide communication between the inlet port 14 and the cylinder chamber 36.

The depending end of the bores 84 are normally closed by spring-type reed check valves 86 biased closed by springs 87, only one being shown (FIGS. 4 and 10). When the piston 32 moves longitudinally within the cylinder 12, as hereinafter explained, it is guided in its longitudinal movement against angular rotation about its longitudinal axis by an external groove 88 vertically formed in its outer surface intermediate its ends which slidably receives the inward end of a guide rod 90, having a diametrically enlarged head 93, projecting inwardly through an aperture 91 in the cylinder wall and nested by a centrally bored boss 92 on the periphery of the sleeve 12 with the rod head 93 maintained sealed fluid-tight by a rod cap 94 and a seal 95.

A centrally bored and threaded boss 98 (FIGS. 1 and 11) on the periphery of the sleeve forming the outlet port 16 permits testing an adjacent relief valve in place, monitoring fluid pressure therein or releasing trapped fluid.

Operation

In operation, the valve 10 is installed in the fluid conductor 18 and is normally in the solid line position of FIGS. 1 and 4 in which the piston 32 normally maintains the fluid passageway 20 closed.

In the event fluid pressure in the upstream end of the fluid passageway 20 and bypass bores 84 exceeds a predetermined value, pressure in the cylinder chamber 36 and piston cavity 35 biases the piston 32 upwardly, as viewed in the drawings, exhausting air in the cylinder chamber 34 through an eccentric bore 96 in the cylinder end wall 26 and collapsing the pin 42, as illustrated by broken lines (FIGS. 1 and 4).

This action substantially axially aligns the piston tube opening 76 with the fluid passageway 20 so that fluid may flow downstream through the outlet 16 to other controls such as a safety relief valve.

After the fluid pressure has decreased and the problems, if any, have been corrected the valve 10 may be reset by removing the pin nut 52, the collapsed pin 42 and manually forcing the piston to the position, illustrated by solid lines (FIG. 4), by pressure manually applied to the outwardly projecting end of the piston rod 38. Downward movement of the piston is stopped by the piston guide pin 90 contacting the upper limit of the piston slot 88 so that the depending end surface of the piston remains in spaced relation with respect to the bottom end wall 22.

A new collapsible pin 42' is obtained from one of the bolts 58 and inserted into the piston bushing 44 and pin bushing 48 and the pin nut 52 replaced.

Obviously the invention is susceptible to changes or alterations without defeating its practicability. Therefore, I do not wish to be confined to the preferred embodiment shown in the drawings and described herein.

I claim:

1. An in-line fluid release valve for a high pressure fluid conductor, comprising:
    a valve body having a body wall forming a cylinder having one closed end and having inlet and outlet ports forming a transverse fluid passageway intermediate its ends adapted to be axially interposed in the fluid conductor,
    said body wall having a bypass opening providing fluid communication between the inlet port and the cylinder adjacent its closed end;
    means including an apertured end wall closing the other end of the cylinder;
    piston means including a piston slidable in the cylinder and having a piston rod projecting outwardly through said apertured end wall,
    said piston normally closing the fluid passageway and having a transverse passageway in its end portion opposite the piston rod for mating with the fluid passageway in response to fluid pressure above a predetermined value acting on the piston end portion opposite is piston rod;
    guide means including a valve body supported guide rod slidably contacting said piston for precluding angular rotation of the piston relative to the valve body; and
    pin means including an axially collapsible pin supported in axial outstanding relation with respect to said piston rod by said end wall for normally maintaining the piston in passageway closed position.

2. The release valve according to claim 1 and further including:
    check valve means including a spring-type check valve for preventing fluid flow through the bypass opening in an upstream direction.

3. The release valve according to claim 1 in which said pin means comprises:
    pin cage means including a top plate secured to said end wall in axial spaced relation with respect to the outwardly projecting end of said piston rod; and,
    an elongated rod-like pin axially extending between said piston rod and said top plate.

4. The release valve according to claim 3 in which said pin cage means further includes:
    a plurality of post means including a like plurality of bolts surrounding said pin in radially spaced relation for connecting said top plate with said apertured end wall.

5. The release valve according to claim 4 in which pin cage means further includes:
    pin deflector means including a deflector plate longitudinally secured to the respective said post means for guiding said pin laterally of the post means when said pin contacts said post means during collapsing movement of the pin.

6. The release valve according to claim 4 in which said pin cage means further includes:
    a V-shaped member having legs angularly diverging from an apex and straddling said post means in longitudinal relation.

7. The release valve according to claim 6 in which the apex of the V-shaped member is disposed in radial alignment with said pin.

8. An in-line fluid release valve for a high pressure fluid conductor, comprising:
    a valve body having a cylinder and having axially aligned inlet and outlet ports forming a transverse fluid passageway adapted to be interposed in the fluid conductor;
    piston means including a piston slidable in the cylinder and having a piston rod projecting outwardly of the valve body and normally closing the fluid passageway,
    said piston having a transverse passageway for mating with the fluid passageway in response to fluid pressure above a predetermined value acting on the piston end portion opposite its rod; and,
    pin cage means including an axially collapsible pin supported in axial outstanding relation with respect to said piston rod by said valve body for normally maintaining the piston in passageway closed position.

9. The release valve according to claim 8 and further including:
    guide means including a valve body supported guide rod for precluding angular rotation of the piston relative to the valve body.

10. The release valve according to claim 9 in which said
    piston is provided with a longitudinally extending slot in its outer surface and said valve body having a wall aperture in cooperative alignment with the piston slot and in which the guide means further includes:
    means on said valve body including an apertured boss surrounding said guide rod for normally maintaining an end portion of said guide rod within the piston slot.

* * * * *